United States Patent
Lopez Alvarez et al.

(10) Patent No.: US 10,428,996 B2
(45) Date of Patent: Oct. 1, 2019

(54) THERMAL INSULATING SYSTEM FOR HIGH TEMPERATURE INDUSTRIAL TANKS AND EQUIPMENT

(71) Applicant: AISLAMIENTOS SUAVAL, S.A., Carreno (asturias) (ES)

(72) Inventors: Jose Luis Lopez Alvarez, Carreno (ES); Ramon Aroza Suarez, Carreno (ES); Luis Miguel Navarro Suay, Carreno (ES); Jose Guillermo Suarez-Valdes Suarez, Carreno (ES)

(73) Assignee: AISLAMIENTOS SUAVAL, S.A., Carreno (Asturias) (ES)

( * ) Notice: Subject to any disclaimer, the term of this patent is extended or adjusted under 35 U.S.C. 154(b) by 0 days.

(21) Appl. No.: 15/770,557

(22) PCT Filed: Nov. 2, 2015

(86) PCT No.: PCT/ES2015/070784
§ 371 (c)(1),
(2) Date: Apr. 24, 2018

(87) PCT Pub. No.: WO2017/077142
PCT Pub. Date: May 11, 2017

(65) Prior Publication Data
US 2019/0056056 A1    Feb. 21, 2019

(51) Int. Cl.
*F16L 59/02* (2006.01)
*B65D 90/06* (2006.01)
(Continued)

(52) U.S. Cl.
CPC ............ *F16L 59/028* (2013.01); *B65D 90/06* (2013.01); *F16L 59/10* (2013.01); *F16L 59/123* (2013.01); *F16L 59/135* (2013.01)

(58) Field of Classification Search
CPC .................. F16L 59/00–135; B65D 90/00–06
See application file for complete search history.

(56) References Cited

U.S. PATENT DOCUMENTS 1,675,354 A  *  7/1928  Kemper ................ B65D 90/06
                                                   220/567.2
1,855,802 A  *  4/1932  Kemper ................ B65D 90/06
                                                   220/560.05
(Continued)

FOREIGN PATENT DOCUMENTS

DE       554374 C      7/1932
DE       1810238 A1    6/1970

OTHER PUBLICATIONS

International Search Report and Written Opinion dated Jul. 6, 2016 for PCT/ES2015/070784.
IPRP dated Jan. 16, 2018 for PCT/ES2015/070784.

*Primary Examiner* — Kareen K Thomas
(74) *Attorney, Agent, or Firm* — Lucas & Mercanti, LLP

(57) ABSTRACT

Thermal insulating system for high temperature industrial tanks and equipment, comprising thermal insulating material, a covering system and a support system. The covering system has covering sheets fixed only to the support system. Adjacent covering sheets overlap longitudinally giving rise to overlapped sections comprising an upper part from one of the adjacent covering sheets and a lower part from the other adjacent covering sheet. At least a substantially omega-shaped longitudinal assembly clip is placed at each overlapped section, on the interior sides of the covering sheets, which has a first end attached to the upper part, a central portion separated from the covering sheets, and a second end contacting the lower part of the overlapped section and pressing said lower part.

6 Claims, 4 Drawing Sheets

(51) Int. Cl.
 *F16L 59/10* (2006.01)
 *F16L 59/12* (2006.01)
 *F16L 59/135* (2006.01)

(56) References Cited

U.S. PATENT DOCUMENTS

| | | | | |
|---|---|---|---|---|
| 2,869,751 A | * | 1/1959 | Klope | B65D 90/06 |
| | | | | 220/565 |
| 3,456,835 A | * | 7/1969 | Marcmann | B65D 90/06 |
| | | | | 220/565 |
| 3,907,049 A | * | 9/1975 | Baffas | B29C 63/00 |
| | | | | 138/155 |
| 4,422,274 A | | 12/1983 | Holliday | |
| 4,637,189 A | * | 1/1987 | Maria van Riet | E04B 1/762 |
| | | | | 52/309.8 |
| 9,255,737 B2 | * | 2/2016 | Ramirez Dala | F27B 17/00 |

* cited by examiner

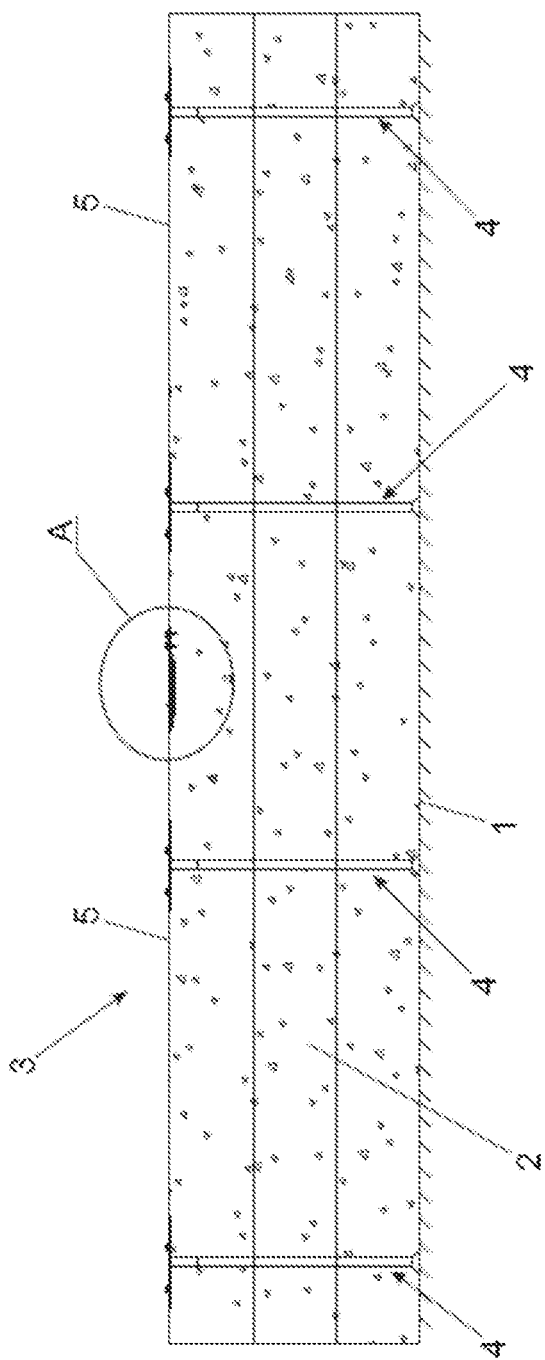

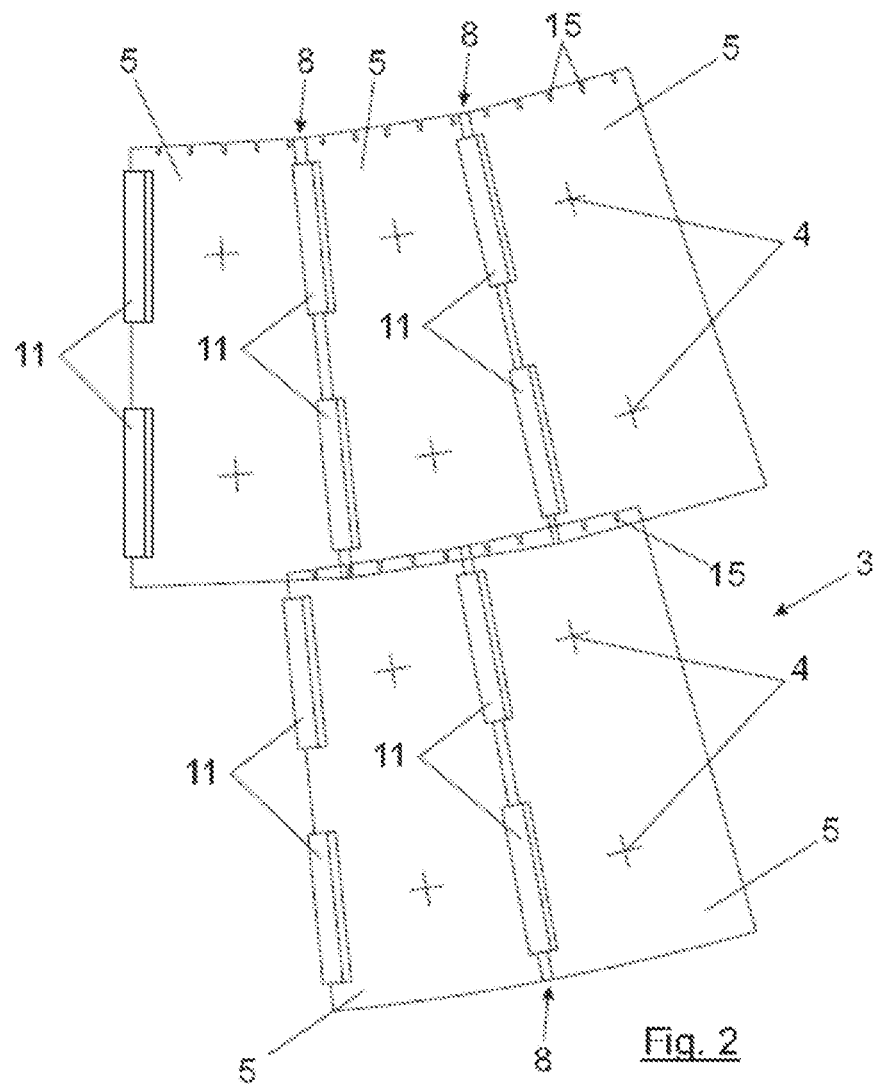
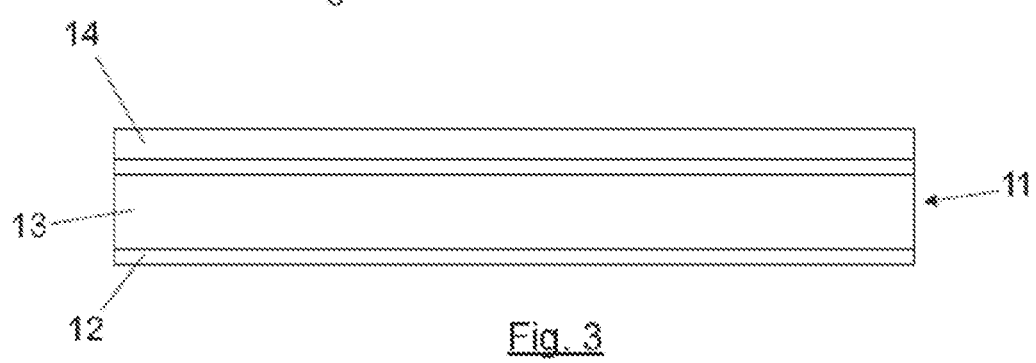

THERMAL INSULATING SYSTEM FOR HIGH TEMPERATURE INDUSTRIAL TANKS AND EQUIPMENT

CROSS REFERENCE TO RELATED APPLICATION

This Application is a 371 of PCT/ES2015/070784 filed on Nov. 2, 2015, which is incorporated herein by reference.

FIELD OF THE INVENTION

The present invention is encompassed within the technical field of industrial facilities and equipment operating at high temperatures, such as equipment for thermal and thermosolar plants, chemical and petrochemical plants and so on, and specifically of thermal insulating systems for industrial tanks and equipment operating at high temperatures, said tanks and equipment suffering significant thermal expansions and contractions during the operation thereof.

The invention relates, in particular, to a thermal insulating system for high temperature industrial tanks and equipment which can absorb these expansions and contractions of the tanks and equipment, while maintaining all insulating properties.

BACKGROUND OF THE INVENTION

Certain industrial production processes and facilities require that high temperatures be maintained throughout said processes. So, the installation of proper thermal insulation is critical, particularly for those elements that comprise said facilities, such as piping, flanges, valves, filters, industrial tanks, deposits, and equipment.

Most of these elements are usually made of metal materials like carbon steel, stainless steels, or special steel alloys. These materials have a thermal expansion coefficient that causes the walls of the tanks, deposits, and equipment to expand due to high temperatures, considerably increasing in size in comparison with the size thereof at cold state. This increase in size varies, depending on the dimension of the tank or equipment, and the temperature to which they are subjected internally due to the fluid or gas that circulates inside them.

In small-sized equipment, the expansion and contraction of the walls is not very significant. The walls of this equipment expand and return to their original dimensions many times with the start-up and stop of the production process, according to the needs.

However, in large-sized equipment, the expansion and contraction of this equipment, mainly tanks, the changes are very significant and they can affect negatively to the thermal insulating systems used.

Thermal insulating methods and systems must guarantee that the thermal transmission be maintained over the life of the equipment.

Nowadays, thermal insulating systems comprise mainly four elements: support system, insulating material, covering system, and fastening and sealing means.

The support elements for the thermal insulating materials and the covering system, should be minimized as much as possible, given that the soldering of these elements to the equipment may weaken the walls of said equipment; furthermore, the thermal transmission coefficient of these metal elements with respect to the equipment is very high, leading to heat losses. Additionally, these elements must withstand the thermal expansions and contractions of the walls of the equipment without suffering breakage or sagging.

Thermal insulating materials installed must maintain their integrity after the equipment expansions and contractions, preventing the formation of gaps and joints between the materials that would create thermal bridging. Likewise, it is critical that they maintain their thickness designed during the engineering stage for the thermal calculations so that when the equipment expands and exerts pressure on the insulating material, the covering materials should not oppose resistance to the expansion, as that would considerably decrease the thickness of the insulation.

The covering system must maintain their integrity after the equipment expands and contracts, since any crack arising from the tensions of the expansions and contractions would cause joints between the sheets of the covering and would allow the insulation to be exposed to the entrance of rain water and wing that could deteriorate the qualities of the insulating materials and prevent the production process from being maintained. The mere entrance of wind between covering sheets could cause the fastenings to burst and the covering sheets to come away.

The covering sheets are fastened to each other and to the support system by means of the fastening and sealing means. These fastening means must also be designed to withstand the expansions and contractions of the walls of the tanks, deposits, and equipment due to high temperatures, without loosening and without producing tears or breakage in the covering sheets they fasten. The sealing means that seal the joints between the covering sheets must maintain their integrity after the equipment expands and contracts, to prevent rain, snow, or wind from getting in.

The insulating systems currently being adopted for the insulation of these kinds of tanks and equipment that are subjected to high-temperature are based on a reinforced design of the support and fastening systems of what would be a conventional insulating system.

Some examples of present thermal insulating systems for tanks and equipment for high-temperature are the following:
  Bolt and retention washer system. These bolts are soldered to the walls of the tank or equipment, go through the insulation and perforate the covering sheets, and due to expansions and contractions, the covering tears, making ways for water and wind to enter the insulation. Moreover, on the outside of the covering the bolts are fasten by means of retention washers, these retention washers preventing the insulation thickness from expanding with the expansion of the tank or equipment.
  Spacing rings system. This system comprises legs that set the distance between the wall of the tank or equipment, and the covering sheets. These legs are fastened with outer spacing rings to which the covering sheet are fastened and that must also withstand the weight of the insulating materials. The legs for the spacing rings may be soldered to the wall of the tank or equipment, or they may have another inner ring contacting the wall of the tank or equipment and to which these legs for the rings are soldered. The expansions and contractions break the fastening rings, allowing water to get inside, and additionally, this system prevents the insulation thickness from expanding with the expansion of the tank or equipment.
  Mixed systems with spacing rings and bolts with retention washers.
  All systems currently being used entail that in all cases the covering sheets which cover the insulating system are fastened to the spacing rings or bolts, and are also fastened to each other on their ends (two or four ends) by means of screws and/or rivets and with sealants made of plastic materials, such as putties and silicones that must be constantly repaired when the equipment expands and contracts. With the breakage, rain water and wind can get inside and gradually deteriorate the insulating material, as well as the covering system.

There are some spacing rings systems that include an omega clip or zeta clip piece on the spacing legs, creating a spring effect, so that this clip can absorb the expansions; however, in that case, two problems arise:

First, when the omega clip absorbs the traction produced by the expansions, a decreasing of the thickness of the insulating materials occurs, diminishing the insulation quality, and putting the maintenance of the production process at risk.

Secondly, the omega clip can never absorb all of the traction, since it must have mechanical resistance to prevent it from breaking; as a result, the covering sheets continue to be subject to resisting forces that lead to breakage and joints.

DESCRIPTION OF THE INVENTION

The present invention provides an advantage with respect to the current insulating systems for high temperature industrial equipment, providing a thermal insulating system for high temperature industrial tanks and equipment which can absorb these expansions and contractions of the tanks and equipment, while maintaining all insulating properties and requirements: keeping the designed insulation thickness, avoiding joints in the covering system and ensuring tightness and integrity in the insulating system.

This is achieved by means of a thermal insulation system for high temperature industrial tanks and equipment as disclosed in claim 1 of the present application.

This thermal insulating system comprises an insulating material which is placed on the walls of the industrial tanks and equipment, a covering system which covers the insulating material, and a support system which supports the insulating material and the covering system.

The covering system of the present thermal insulating system comprises a plurality of covering sheets, these covering sheets having in turn an exterior side and an interior side which contacts the insulating material.

Each covering sheet is fixed only to the support system, unlike the covering sheets of the state of the art, in which each covering sheet is fixed to the support system and to the adjacent covers sheets.

However, in the present invention, adjacent covering sheets are not fixed at each other, but they overlap longitudinally one over the other, giving rise to overlapped sections. So, these overlapped sections have an upper part which belongs to one of the adjacent covering sheets and a lower part which belongs to the other adjacent covering sheet.

Additionally, the covering system of the present thermal insulating system comprises at least a substantially omega-shaped longitudinal assembly clip, which is placed at each overlapped section, on the interior sides of the covering sheets. Specifically, these assembly clips have a first end attached to the upper part of the overlapped section, a central portion separated from the covering sheets, and a second end contacting the lower part of the overlapped section and pressing said lower part.

Therefore, the longitudinal assembly clip retains the lower part of the overlapped sections against the upper part in such position that said lower part always contacts said upper part at least on one point.

So, the covering sheets are not fixed to each other at any point, creating in this way a flake of independent pieces that move according to the required due to the expansion and contraction of the tank or equipment, avoiding the covering sheets be torn apart and deteriorated and reducing so the thermal losses. Besides, this system provides a decreasing of the volume of the support system to be soldered to the equipment by 60%.

Additionally, since the covering sheets are not fixed to each other, this system does not require anymore certain accessories used to assemble the covering sheets to each other, and it does not require any kind of silicone or putty type sealant that do not resist the pulling forces of the expansions.

Moreover, the covering sheets are not perforated by bolts at any point, preventing in this way they be torn apart and deteriorated.

Preferably, the upper part and the lower part comprise at least a drainage groove.

According a particular embodiment of the thermal insulating system, the support system has a plurality of support elements, which have in turn a plurality of metal bolts fixable perpendicularly to the surface of the industrial tanks and equipment, with a length equal to the thickness of the insulating material, and a plate attached perpendicularly to each bolt.

In accordance with a preferred embodiment of the invention each covering sheet is fixed to at least to two support elements.

According a preferred embodiment of the present invention, the covering sheets comprise at the sides transverse to the overlapped sections a plurality of tears.

So, the thermal insulating system of the present invention is used for industrial tanks and equipment that operate at high temperatures and undergo significant thermal expansions and contractions, and it can absorb these expansions and contractions while maintaining all their properties according their design. This insulating system withstands the expansions and contractions suffered by tanks and equipment, maintaining the integrity and quality of the insulation, besides the air, water and snow tightness of the covering system.

This thermal insulating system decreases the support systems required up to 60% with reference to the insulating systems of the state of the art.

Additionally, the thermal insulating system of the present invention enables the covering sheets to move independently and freely, since no part of a covering sheet is fastened to any other adjacent covering sheet, maintaining in this way the tightness of the system, and the integrity of the covering system despite the expansions and contractions caused by the high temperatures suffered.

BRIEF DESCRIPTION OF THE DRAWINGS

Next, in order to facilitate the comprehension of the invention, in an illustrative rather than limitative manner an embodiment of the invention with reference to a series of figures shall be made below.

FIG. 1 is a frontal section of a particular embodiment of the present invention which shows an overall view of the main elements.

FIG. 2 is a schematic plan view of the interior side of the covering sheets of the embodiment of FIG. 1 showing the overlapped sections and the longitudinal assembly clip.

FIG. 3 is a plan view of the longitudinal assembly clip of the present invention.

Figure 4:
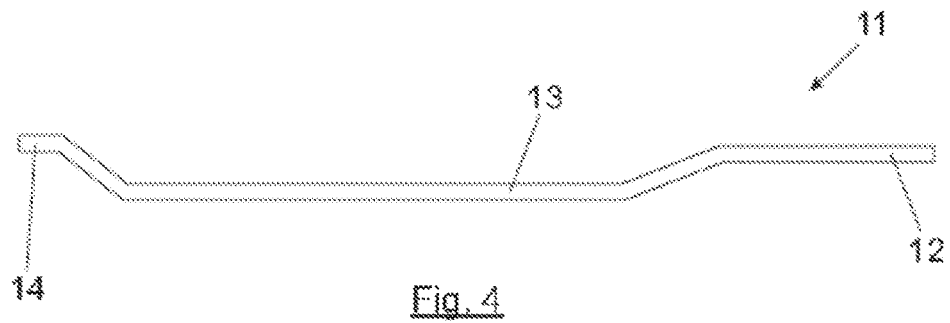
FIG. 4 is a frontal view of the longitudinal assembly clip of FIG. 4.

These figures refer to the following set of elements:
1. walls of the industrial tanks and equipments
2. insulating material
3. covering system
4. support elements
5. covering sheets of the covering system
6. exterior side of the covering sheets
7. interior side of the covering sheets
8. overlapped section
9. upper part of the overlapped section
10. lower part of the overlapped section
11. longitudinal assembly clips
12. first end of the longitudinal assembly clips
13. central portion of the longitudinal assembly clips
14. second end of the longitudinal assembly clips
15. tears of the covering sheets
16. bolts of the support system
17. plate of the support system
18. grooves of the upper part and the lower part
19. adjustment element of the support system

DETAILED DESCRIPTION OF THE INVENTION

The object of the present invention is a thermal insulating system for high temperature industrial tanks and equipment.

As shown in FIG. 1, the thermal insulating system has an insulating material 2, which is placed on the walls 1 of the industrial tanks and equipment, a covering system 3, which covers the insulating material 2, and a support system, which supports the insulating material 2 and the covering system 3.

The covering system 3 has a plurality of covering sheets 5 comprising in turn an exterior side 6 and an interior side 7, which contacts the insulating material 2 placed on the walls 1 of the industrial tank or equipment.

According different embodiments of the invention, these covering sheets 5 may be made of any alloy deemed to be optimal depending on the environmental conditions they must withstand. Thickness of the covering sheets 5 will be determined based on the mechanical resistance required, being at least 0.4 mm thick. The width and length will be calculated on the basis of the dimensions of the tank or equipment to be insulated, since said covering sheets will have to adapt to the shape thereof, although an ideal size would be 4 m×2 m, since so large size of the covering sheets 5 provide less joints and allow a better assembly.

Each covering sheet 5 is fixed only to the support system. FIGS. 1 and 2 show how the covering sheets 5 are fixed to the support system. Particularly, these covering sheets 5 may be fixed to the support system by means of screws or rivets, but they will not be fixed to any other covering sheet 5 at any point.

In accordance with the present invention, adjacent covering sheets 5 overlap longitudinally one over the other, giving rise to overlapped sections 8. These overlapped sections 8 comprise an upper part 9 belonging to one of the adjacent covering sheets 5 and a lower part 10 belonging to the other adjacent covering sheet 5.

Additionally, the covering system 3 has at least a substantially omega-shaped longitudinal assembly clip 11 placed at each overlapped section 8, specifically on the interior sides 7 of the covering sheets 5. These longitudinal assembly clips 11 comprises in turn a first end 12 attached to the upper part 9 of the overlapped section 8, a central portion 13 separated from the covering sheets 5, and a second end 14 contacting the lower part 10 of the overlapped section 8 and pressing said lower part 10.

FIGS. 3 and 4 show an omega-shaped longitudinal assembly clip 11 of the present invention.

According the present invention, the longitudinal assembly clip 11 retains the lower part 10 of the overlapped sections 8 against the upper part 9 in such position that the lower part 10 always contacts said upper part 9 at least on one point, preventing the entrance of elements from the exterior, such as rain, snow and wind, into the insulating material 2.

Figure 5A:
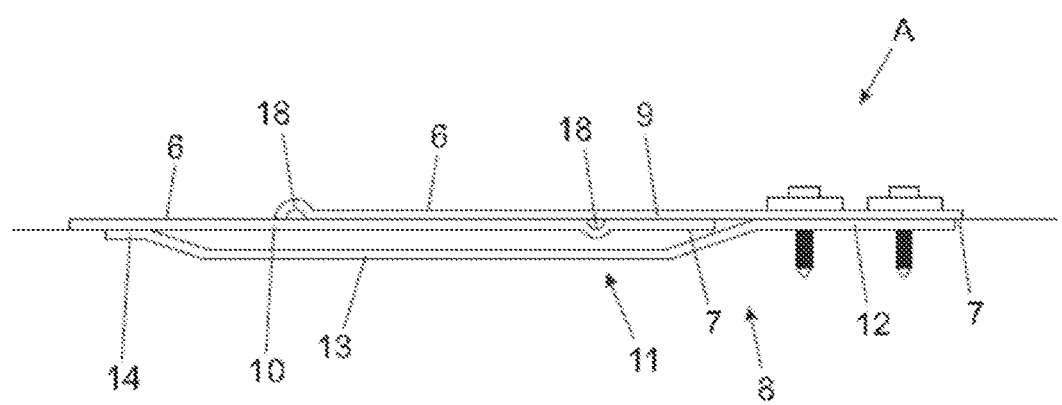
FIG. 5a is a detailed view of the section A of FIG. 1, showing a frontal view of an overlapped section in a first position, with the upper part and lower part, and the longitudinal assembly clip.
Figure 5B:
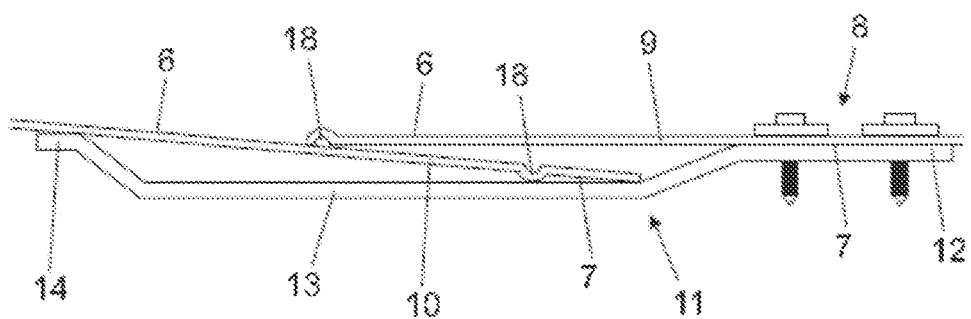
FIG. 5b is a detailed frontal view of the overlapped section of FIG. 5a in a second position, with the upper part and lower part, and the longitudinal assembly clip.

FIGS. 1, and 5a and 5b show an overlapped section 8 including the upper part 9 and the lower part, and the omega-shaped longitudinal assembly clip 11 placed on the interior sides 7 of the covering sheets 5.

The longitudinal assembly clips 11 are screwed or riveted to the interior side 7 of the upper part 9 of the overlapped section 8, and it will pressure permanently against the upper part 9 and the lower part 10, preventing the separation of both parts 9,10 and avoiding the entrance of rain, wind or snow inside the insulation material 2, and additionally allowing the relative movement of adjacent covering sheets 5 due to expansions and contractions of the walls 1 of the industrial tanks or equipment.

This effect is achieved by means of the omega shape of the longitudinal assembly clip 11, since the first end 12 of the assembly clip 11 is attached to the upper part 9, but the second end 13 of the assembly clip 11 is not fixed to the lower part 10, but it contacts said lower part 10 without fixing means, pressuring said lower part 10 against the upper part 9.

As it can be seen in FIGS. 5a y 5b, the central portion 13 of the longitudinal assembly clip 11 is separated from the covering sheets 5, allowing a tiny vertical displacement of the lower part 10 regarding the upper part 9 until it is blocked by said central portion 13, but the lower part 10 always contacting the upper part 9 at least on one point. In this way, although the rain, snow or wind displace the lower part 10 downwards, said lower part 10 is blocked by the central portion 13 of the assembly clip 11, and the lower part 10 always contacts the upper part 9 preventing the entrance of rain, snow or wind inside the insulation material 2.

According a preferred embodiment of the present invention, the upper part 9 and the lower part 10 of the overlapped sections 8 comprise at least a drainage groove 18, in order to easily evacuate liquid from the covering sheets, so that in the unlikely event of liquid entrance into the system, said liquid is easily evacuated.

In accordance with a preferred embodiment of the invention, the covering sheets 5 of the covering system 3 and the longitudinal assembly clips 11 are made of metal.

Figure 6:
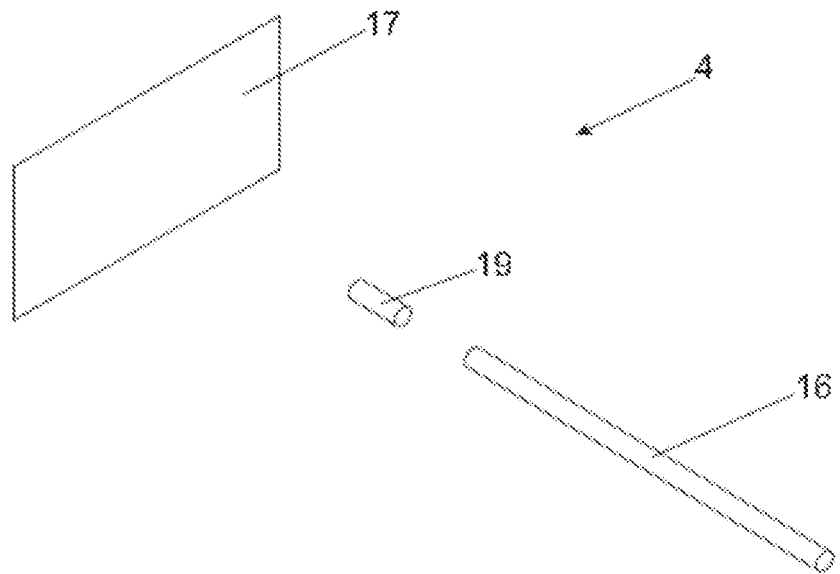
FIG. 6 shows a support element according a preferred embodiment of the support system of the invention.
Figure 7:
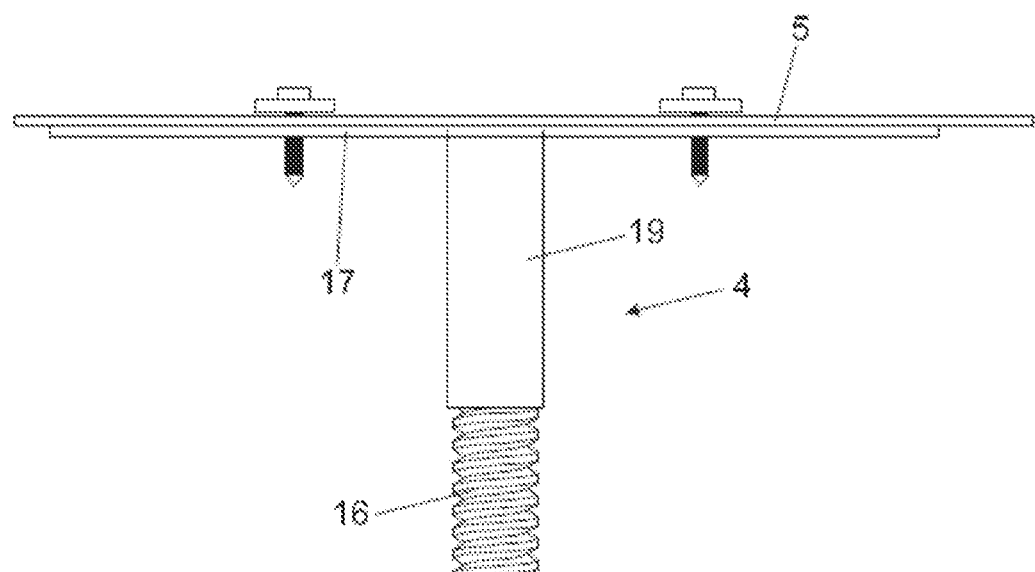
FIG. 7 shows a detailed view of a covering sheet fixed to the support element of FIG. 6.

According a particular embodiment of the present invention, the support system comprises a plurality of support elements 4, which comprise in turn a plurality of metal bolts 16 fixable perpendicularly to the surface of the industrial tanks or equipment, and a plate 17 attached perpendicularly to each bolt 16 by means of an adjustment element 19, as a sleeve or similar. The bolts 16 have a length equal to the thickness of the insulating material. FIGS. 6 and 7 shows the particular embodiment of the support elements 4, while FIG. 1 shows the position of the support elements 4 regarding the insulation material 2, the covering system 3, and the walls 1 of the industrial tank or equipment.

Preferably, the bolts 16 are fixed to the surface of the industrial tanks or equipment, by means of welding, and they may be cylindrical or have any other geometry. The diameter, cross-section, or thickness of the bolts 16 will depend on the weight of the insulation materials and the covering system to be installed, varying from 2 mm to 30 mm in size. These bolts 16 will be soldered to the tank or equipment on one end, while the other end of the bolts 16 will be threaded to the adjustment element 19, which in turn will be welded to the plate 17.

According different particular embodiments, the dimensions of the plate 17 may vary in thickness from 1 mm to 10 mm, in width from 20 mm to 400 mm, and in length from 30 mm to 500 mm. This plate will serve as a top to limit the insulation material 2 and a support for the covering sheets 5.

FIG. 2 shows a preferred embodiment of the present invention, in which each covering sheet 5 is fixed to at least two support elements 4, although the number of support elements 4 will be defined according the dimensions of the covering sheets to be installed.

Preferably the covering sheets 5 comprise at the sides which are transverse to the overlapped sections 8, a plurality of tears 15. FIG. 2 shows the tears of the covering sheets 5. These tears 15 will allow to install a mobile clip, screw or rod that will guide different covering sheets 5 without fixing them to each other, allowing in this way expansions and contractions along all directions additionally to the overlapped sections 8.

Once the invention has been clearly described, it is hereby noted that the particular embodiments described above can be the subject of detail modifications as long as they do not alter the fundamental principle and the essence of the invention.

The invention claimed is:

1. Thermal insulating system for high temperature industrial tanks and equipment, comprising
   an insulating material placed on a wall of the industrial tanks and equipment,
   a covering system covering the insulating material, and
   a support system supporting the insulating material and the covering system, the thermal insulating system for high temperature industrial tanks and equipment wherein
   the covering system comprises a plurality of covering sheets,
   a plurality of each covering sheet is fixed only to the support system,
   adjacent covering sheets overlap longitudinally one over the other, giving rise to overlapped sections, an overlapped sections comprising
      an upper part belonging to one of the adjacent covering sheets and
      a lower part belonging to the other adjacent covering sheet,
   the covering system comprises at least a substantially omega-shaped longitudinal assembly clip placed at a plurality of each overlapped section, on the interior sides of the covering sheets, the longitudinal assembly clip comprising in turn
      a first end attached to the upper part of the overlapped section,
      a central portion separated from the covering sheets, and
      a second end contacting the lower part of the overlapped section and pressing said lower part,
   and the longitudinal assembly clip retains the lower part of the overlapped sections against the upper part in such position that a plurality of said lower part always contacts said upper part at least on one point.

2. Thermal insulating system for high temperature industrial tanks and equipment, according to claim 1, wherein
   the support system comprises a plurality of support elements comprising in turn
      a plurality of metal bolts fixable perpendicularly to a surface of the industrial tanks and equipment, the bolts having a length equal to the thickness of the insulating material, and
      a plate attached perpendicularly to each bolt.

3. Thermal insulating system for high temperature industrial tanks and equipment, according to claim 2, wherein each covering sheet is fixed to at least two support elements.

4. Thermal insulating system for high temperature industrial tanks and equipment, according to claim 1, wherein the covering sheets comprise at the sides transverse to the overlapped sections a plurality of tears.

5. Thermal insulating system for high temperature industrial tanks and equipment, according to claim 1, wherein the covering sheets of the covering system and the longitudinal assembly clips are made of metal.

6. Thermal insulating system for high temperature industrial tanks and equipment, according to claim 1, wherein the upper part and the lower part of the overlapped sections comprise at least a drainage groove.

* * * * *